United States Patent
Lease et al.

[11] Patent Number: 5,838,241
[45] Date of Patent: Nov. 17, 1998

[54] LIQUID LEVEL TRANSMITTER

[75] Inventors: Benjamin N. Lease; Otis P. Pierson, both of Knoxville, Tenn.

[73] Assignee: Robertshaw Controls Company, Richmond, Va.

[21] Appl. No.: 768,528

[22] Filed: Dec. 18, 1996

[51] Int. Cl.[6] .................................................. G08B 21/00
[52] U.S. Cl. ...................... 340/618; 73/304 C; 324/658; 324/663
[58] Field of Search ................................... 340/618, 514, 340/562; 324/658, 663; 73/304 C

[56] References Cited

U.S. PATENT DOCUMENTS

| | | | |
|---|---|---|---|
| 4,145,619 | 3/1979 | Tseng | 307/118 |
| 4,224,606 | 9/1980 | Bartles | 340/514 |
| 4,676,100 | 6/1987 | Eichberger | 73/304 C |
| 5,042,299 | 8/1991 | Wells | 324/663 |
| 5,073,757 | 12/1991 | George | 324/658 |
| 5,121,632 | 6/1992 | Keeler et al. | 73/304 C |
| 5,406,843 | 4/1995 | Hannan et al. | 73/304 C |
| 5,446,444 | 8/1995 | Lease | 340/514 |
| 5,463,378 | 10/1995 | Gibb | 340/618 |

*Primary Examiner*—Jeffery A. Hofsass
*Assistant Examiner*—John Tweel, Jr.
*Attorney, Agent, or Firm*—Watts, Hoffmann, Fisher & Heinke Co., L.P.A.

[57] ABSTRACT

A level detector circuit for detecting a level of immersion of an elongated probe within a liquid. The level detection circuit includes a first set of transistors. One of these transistors charges an elongated probe and a second charges a capacitor. A reference current source provides a reference current based on the charging current provided to the elongated probe by the first transistor and an additional transistor which also charges the probe at a rate such that the voltage on the capacitor and the probe are maintained the same. A monitoring circuit develops an analog level signal based on the current provided by the reference current source. This analog level signal is converted by the combination of an analog to digital circuit and a microprocessor for providing a pulse frequency modulated communications signal corresponding to the analog level signal which in turn is related to the length of the probe immersed within the liquid.

13 Claims, 5 Drawing Sheets

LIQUID LEVEL TRANSMITTER

FIELD OF THE INVENTION

The present invention concerns a liquid level monitoring circuit for use in determining a liquid level in a vessel.

BACKGROUND ART

Robertshaw Controls Company, assignee of the present invention, sells a liquid level sensor for detecting the presence or absence of a liquid and providing an output that activates an alarm. This prior art sensor is sold under the designation Mini-Tek 800. The Mini-Tek 800 sensor has a probe that determines a liquid level at a probe site by monitoring capacitance changes caused by changes in liquid level.

U.S. Pat. No. 4,145,619 discloses a capacitance transmitter suited for use with a capacitance probe for level, pressure or proximity measurement in which the capacitance of the probe member responds to the sensed physical parameter.

U.S. Pat. No. 4,224,606 discloses a fluid level control circuit having a test function. Pressing a test switch reduces voltage at an FET gate and takes the FET from a pinched-off condition allowing a drain capacitor to discharge through the FET. This drops a relay out of the circuit and closes an alarm contact to actuate an alarm.

U.S. Pat. No. 4,676,100 discloses a test circuit for simulating a "high" material level in an LC resonant frequency fluid level indicator. Closing a switch activates a second switch and adds three capacitors in parallel with the probe. The increased capacitance causes a threshold detector to indicate a "high" material level.

U.S. Pat. No. 5,121,632 discloses a sensor including a self-diagnostic routine which connects the probe to a comparator that compares the voltage on the probe to a supply voltage. Under normal conditions, the variable capacitance of the probe will charge up to a supply voltage. If the probe is shorted, then the variable capacitor will not charge up and cause the output of the comparator to be high to flag an error condition on a microprocessor controller.

U.S. Pat. No. 5,446,444 to Lease discloses a test circuit for testing operation of a liquid level detector. A probe is placed at a test site and a control circuit monitors changes in capacitance of the probe due to changes in the liquid level at the test site. A test switch controls an input to the probe which causes the control circuit to sense an alarm condition. The disclosure of U.S. Pat. No. 5,446,444 is incorporated herein by reference.

Disclosure of the Invention

One embodiment of a level detector circuit constructed in accordance with the present invention detects a level of immersion of an elongated probe within a liquid. The level detection circuit includes a first current source for charging an elongated probe with an electric current that depends upon a length of the elongated probe immersed within a liquid. A second current source provides a second current based on the charging current provided to the elongated probe by the first current source. A monitoring circuit develops an analog level signal based on the current provided by the reference current source. This analog level signal is converted by a conversion circuit coupled to the monitoring circuit to provide a frequency modulated communications signal corresponding to the analog level signal which in turn is related to the length of the probe immersed within the liquid.

A preferred embodiment of the level detection circuit includes a sensing circuit that monitors a voltage on the elongated probe as the first current source charges the probe. The sensing circuit is coupled to the second current source and controls current generated by the second current source based on the sensing of the voltage on the probe. In accordance with a preferred embodiment of the invention, the first current source is a first regulated current carrying device. The level detection circuit further includes an additional regulated current carrying device that charges a capacitor at a constant current rate. The sensing circuit compares the voltage on the capacitor with the voltage on the probe to provide a control signal for adjusting current provided by the second current source.

The second current source most preferably includes a regulated current carrying device that is regulated by the control signal from the sensing circuit. The first current source comprises a control signal regulated current carrying device which tracks current through the control signal regulated current carrying device of the second current source to charge the elongated probe at a rate dependent on the control signal from the sensing circuit.

BEST MODE FOR PRACTICING THE INVENTION

Figure 1:
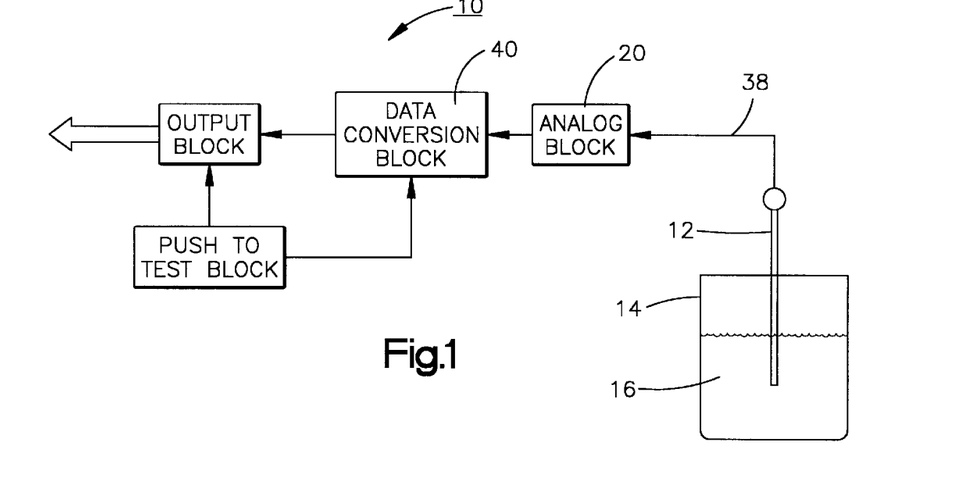
FIG. 1 is a functional block diagram of a system for activating an elongated test probe constructed in accordance with the present invention.
Figure 2:
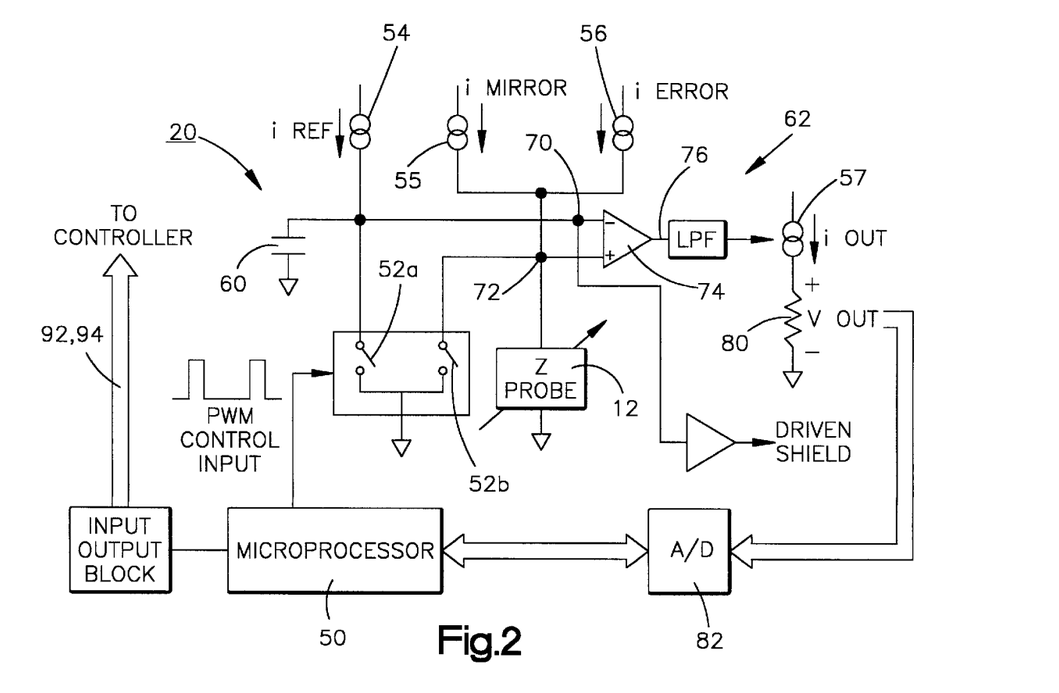
FIG. 2 is an overview schematic of a circuit constructed in accordance with the present invention.

Turning now to the drawings, FIG. 1 is a functional block diagram of a monitoring system 10 coupled to an elongated probe 12 immersed in a vessel 14 containing a liquid 16. When a voltage is coupled to the probe 12, the probe 12 acts as a capacitor. The system 10 charges and discharges the probe at regular intervals to obtain an indication of the depth or level of the liquid within the vessel. The charging and discharging of this probe is performed by an analog circuit 20 that is schematically depicted in FIG. 2. The analog circuit 20 is supported within a housing 30 (See FIG. 4) that supports the probe 12. A probe support portion 32 of the housing 30 defines a threaded opening so that a threaded coupling 34 connected to the probe 12 can be attached to the housing 30. An outer portion 36 of the coupling 34 is threaded for engaging a threaded opening in a vessel.

Alternate uses of the invention separate the probe 12 from the analog circuit 20 for energizing the probe. The separation between the probe and the circuit 20 can be as much as 200 feet. In this embodiment the cabling 38 that couples the analog block 20 to the probe 12 includes a shielded outer conductor 39 that is energized by a voltage signal that enhances operation of the sensor. In addition to the analog circuit 20, the FIG. 2 schematic includes a microprocessor controller 50 and an analog to digital converter 82 which combine to form a data conversion block 40 of the system 10. The microprocessor controller 50 is coupled to a set of two parallel switches 52*a*, 52*b* coupled to three current sources 54–56. The microprocessor controller 50 executes a stored program that determines a liquid level in the vessel 14 in accordance with the FIG. 3 flow diagram. At periodic intervals the microprocessor controller temporarily closes the switches 52*a*, 52*b* to cause charge supplied by the current sources 54–56 to flow away from a reference capacitor 60 and the probe 12. Once the switches 52*a*, 52*b* are again opened, the capacitor 60 and probe 12 are again charged by current from the sources 54–56. The capacitor 60 is charged by the current source 54 when the switch 52*a* opens and the probe 12 is charged by a parallel combination of the two sources 55, 56 when the switch 52*b* opens.

The current source 55 charges the elongated probe 12 at a fixed rate that is supplemented by charge from the current source 56 which charges the elongated probe 12 at a variable rate related to the liquid level on the elongated probe.

A monitoring circuitry 62 monitors first and second signals at two junctions 70, 72 based on the charging of the elongated probe 12 and the capacitor 60 by the two current sources 54, 55 and adjusts the current supplied by the third current source 56. An amplifier 74 provides a difference signal output 76 related to a difference between the first and second signals at the junctions 70, 72 to adjust the current supplied by the current sources 56, 57.

The current through the source 56 tracks the current through the source 57. The amplifier 74 adjusts current provided by the current source 56 to equalize the voltage at the two junctions 70, 72 as the probe 12 and the capacitor 60 are charged. The current through the source 57 flows through a resistor 80 and develops a voltage drop across the resistor 80. This voltage is monitored by the microprocessor 50 as an indication of the liquid level in the vessel 14. As the capacitor and probe continue to charge to increasing voltages, the current through the source 56 and hence the resistor 80 stabilizes at a value that makes the voltage at the junctions 70, 72 the same. (This assumes there is not a dramatic change in the capacitance of the probe)

Figure 4:
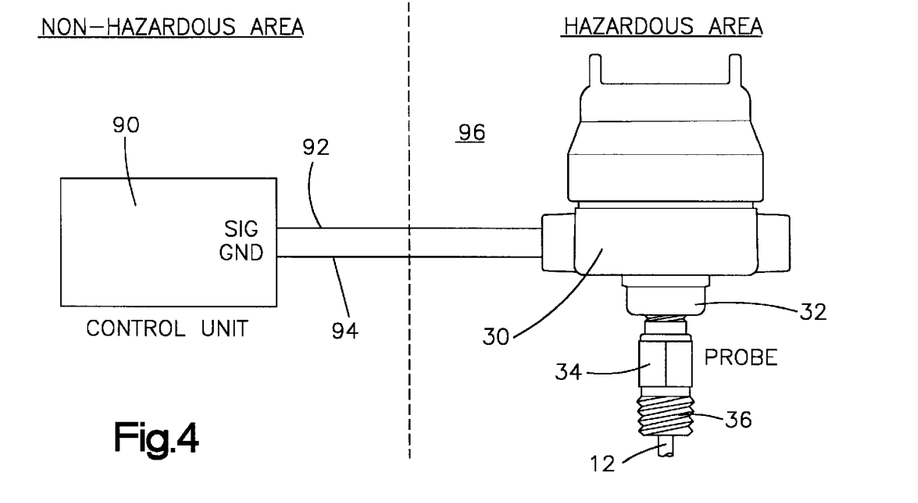
FIG. 4 is an elevation view of a probe housing constructed in accordance with the present invention.

The voltage drop across the resistor 80 is an analog signal that is converted to a digital signal by an analog-to-digital converter circuit 82. A digital signal corresponding to the voltage drop across the resistor 80 is coupled to the microprocessor 50 and converted into a frequency modulated signal for transmission to a controller 90. As seen in FIG. 4, the controller 90 is coupled to the circuitry within the housing 30 by means of two conductors 92, 94 that can be used for example to isolate the controller 90 from a hazardous region or zone 96 in which the vessel 14 is located.

Figure 5A:
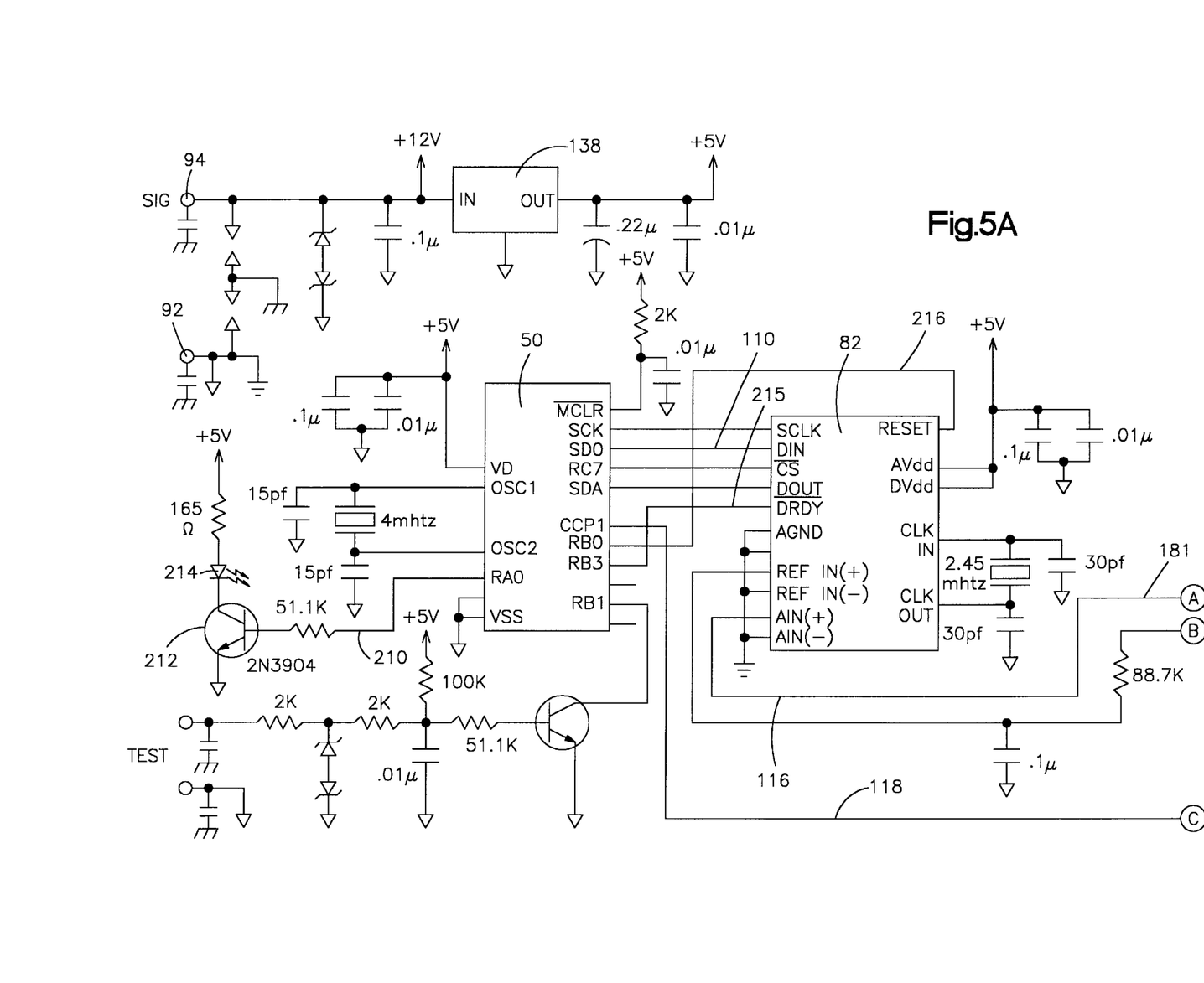
FIGS. 5A and 5B are detailed schematics of a control circuit for energizing a probe constructed in accordance with the invention.
Figure 5B:
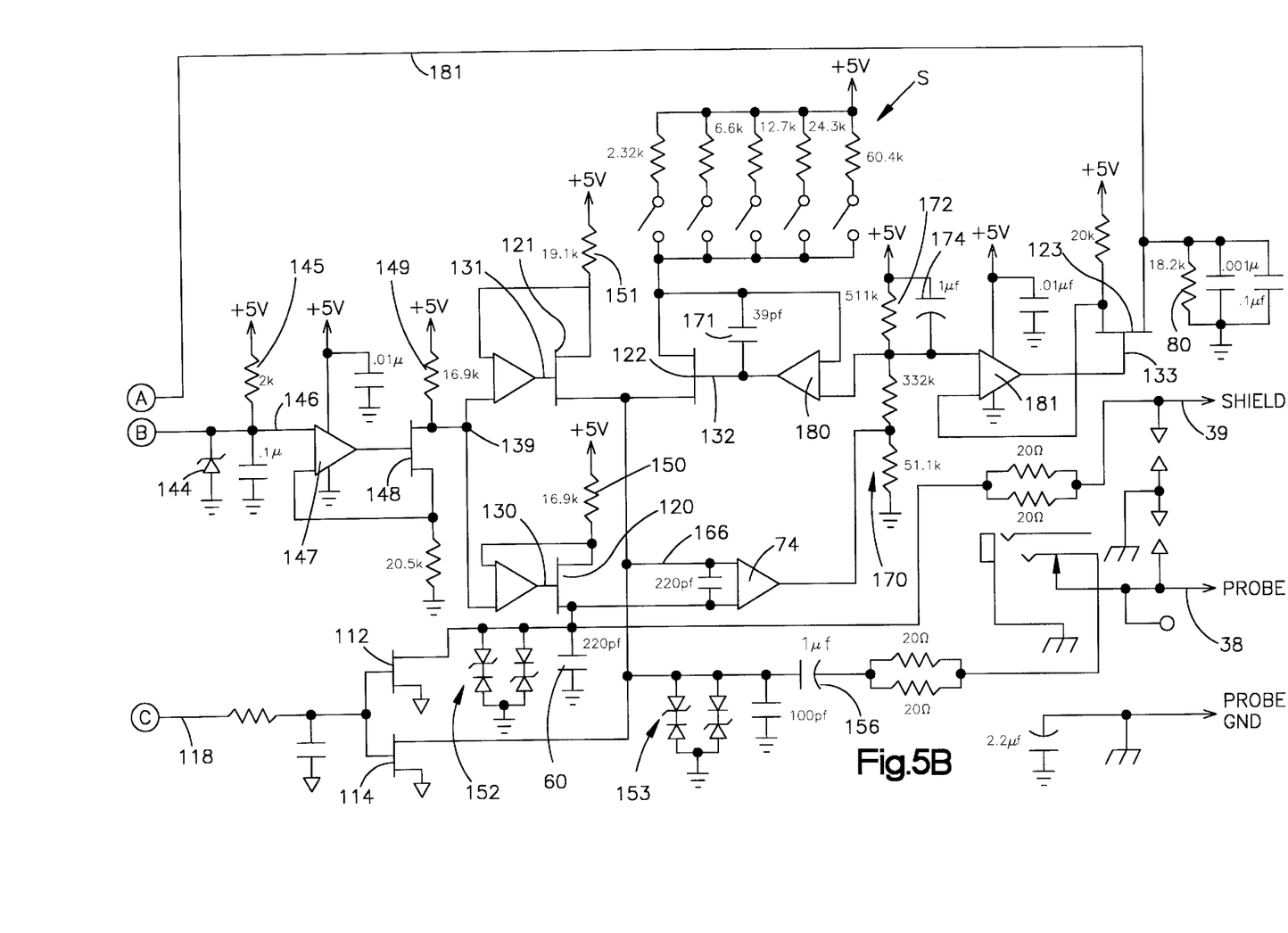

A more detailed circuit schematic of the system 10 is illustrated in FIGS. 5A and 5B. In these two more detailed schematics like reference characters are used for components common with FIG. 2. The microprocessor 50 (FIG. 5A) is an eight bit microprocessor sold under part number PIC16C62A and stores its operating program within its internal memory.

The microprocessor is connected by a serial data connection 110 to the A/D convertor 82. Two field effect transistors 112, 114 (FIG. 5B) have their gates coupled to a control output 118 from the microprocessor 50 and are turned on and off by the microprocessor 50 to selectively charge and discharge the capacitor 60 and probe 12. When the two transistors 112, 114 turn on, the capacitor 60 (220 pf) and the probe 12 are discharged.

When the field effect transistors 112, 114 are turned off, the capacitor and the probe charge through the sources 54–56. As seen in FIG. 5B, the four current sources 54–57 that are schematically depicted in FIG. 2 are implemented with four FET transistors 120–123 that conduct current at a rate controlled by signals on their gate inputs 130–133.

Operating voltage for the circuits depicted in FIGS. 5A and 5B is provided by a five volt input signal from a five-volt voltage regulator 138. A junction 139 is coupled to the inputs 140, 141 of two operational amplifiers 142, 143. These operational amplifiers 142, 143 have outputs coupled to the gate inputs 130, 131 of the two transistors 120, 121 which form the current sources 54, 55.

At the extreme left hand margin of FIG. 5B a precision voltage control device 144 is connected to a five volt power supply signal through a resistor 145. This device 144 maintains an input 146 to an operational amplifier 147 at a value of 2.5 volts. This in turn controls an output from the operational amplifier 147 to bias an FET transistor 148. The FET 148 is a precision current source that maintains the current through a 16.9 Kohm resistor 149 regardless of fluctuations in the value of the five volt supply voltage.

Current through the transistors 120, 121 stabilizes such that the voltage drop across the resistor 149 connected to both the operational amplifiers 142, 143 equals the voltage drop across two resistors 150, 151 coupled to the FETs 121, 120. This arrangement provides a constant current that does not vary with supply voltage for charging the reference capacitor 60. Two sets of transient protection diodes 152, 153 having a breakdown voltage of 22 volts provide bi-directional transient protection to the analog circuit 20. In a circuit configuration where the probe 12 and the analog circuit that activates the probe are spaced apart, the cable shield 39 is maintained at the same electric potential as the voltage on the reference capacitor 60.

The second FET transistor 121 provides current to the probe 12 through a DC blocking capacitor 156. The voltage on the probe 12 forms an input 166 to the differential amplifier 74. An output from the differential amplifier 74 is an analog signal that is transmitted to a voltage divider 170. The analog output from the differential amplifier 74 is filtered by the combination of resistor 172 and capacitor 174 that are connected to the five-volt (+5) power supply signal. The filtered DC signal from the differential amplifier 74 is input to two operational amplifiers 180, 181 used to drive the base inputs 132, 133 of a second pair of FET transistors 122, 123.

The current through this second pair of transistors 122, 123 is controlled by the difference signal from the operational amplifier 74. This signal causes a voltage on the probe 12 to be maintained at the same voltage as the voltage on the reference capacitor 60. This is accomplished by controlling the output of the operational amplifier 180 based on the voltage difference signal from the differential amplifier 74 which in turn adjusts charging of the probe by the FET 122.

An array S of switches couple a selected one of five resistors to a feedback capacitor 171 coupled to the output of the amplifier 180. The array S is implemented by means of a dip switch for adjusting the range of the control. The switches implement a gain adjustment on the amplifier 180 that allows the current through the transistor 122 to be scaled for different probe impedances.

A second FET transistor 123 coupled to the amplifier 181 provides current to the sample resistor 80 across which a voltage output 181 is generated. The signal across the resistor 80 has a dynamic range of 0 to 1.8 volts D.C. This range is constant regardless of the choice of the gain control resistor chosen by the switch array S. The choice of switch setting is used to maximize the sensor dynamic range for different probe capacitances. The five ranges that are possible are 0–200 pf, 0–500 pf, 0–1000 pf, 0–2000 pf, and 0–6000 pf.

In operation, the current through the FET transistor pairs is adjusted to equalize the voltage on the capacitor 60 and probe 12. Since the capacitance of the probe varies with liquid level, the current through the transistor 122 required to maintain the voltage equal to the voltage on the capacitor 60 also changes. This current is a measure of the capacitance of the probe and is obtained as a voltage output 181 across the sample resistor 80 which in turn is fed back to the analog-to-digital convertor 82. The analog-to-digital convertor 82 is a commercially available device from Analogue Devices and provides a serial data input on the serial channel 110 in response to data acquisition control from the microprocessor 50.

The microprocessor 50 controls an output 210 to turn on and off a transistor 212 and associated light emitting diode 214 as a means of signaling the controller 90. When the transistor 212 is turned on, the circuit 10 draws 20 milliamps of current. When the transistor 212 is not turned on, the circuit 10 draws approximately 4 milliamps of current. By monitoring the current drawn on the two conductors 92, 94 the controller 90 can determine the frequency with which the transistor 212 is turned on and off which in turn is representative of a 16 bit digital data input from the analog-to-digital convertor 82 to the microprocessor 50 corresponding to the voltage drop across the resistor 80.

The analog-to-digital converter 82 updates the analog data from the sampling resistor 80 at a rate of 20 hertz. The communications between the microprocessor 50 and the analog-to-digital converter 82 are via a three wire serial peripheral interface data bus. Both transmission and reception are permitted on the bus. Collision avoidance is built into the interface and is implemented in the software of the microprocessor operating system. A data ready pin 215 on the A/D converter 82 informs the microprocessor 50 when new conversion data is available and if errors in transmission occur. The data ready pin 215 is also used for frame synchronization of all transmitted and received data. A reset line 216 for the A/D converter 82 is also connected to the microprocessor 50. This allows the microprocessor to arbitrarily reset the A/D converter and would be advantageous in the case of a communications fault, a low power condition or as part of a diagnostic test procedure.

Figure 3:
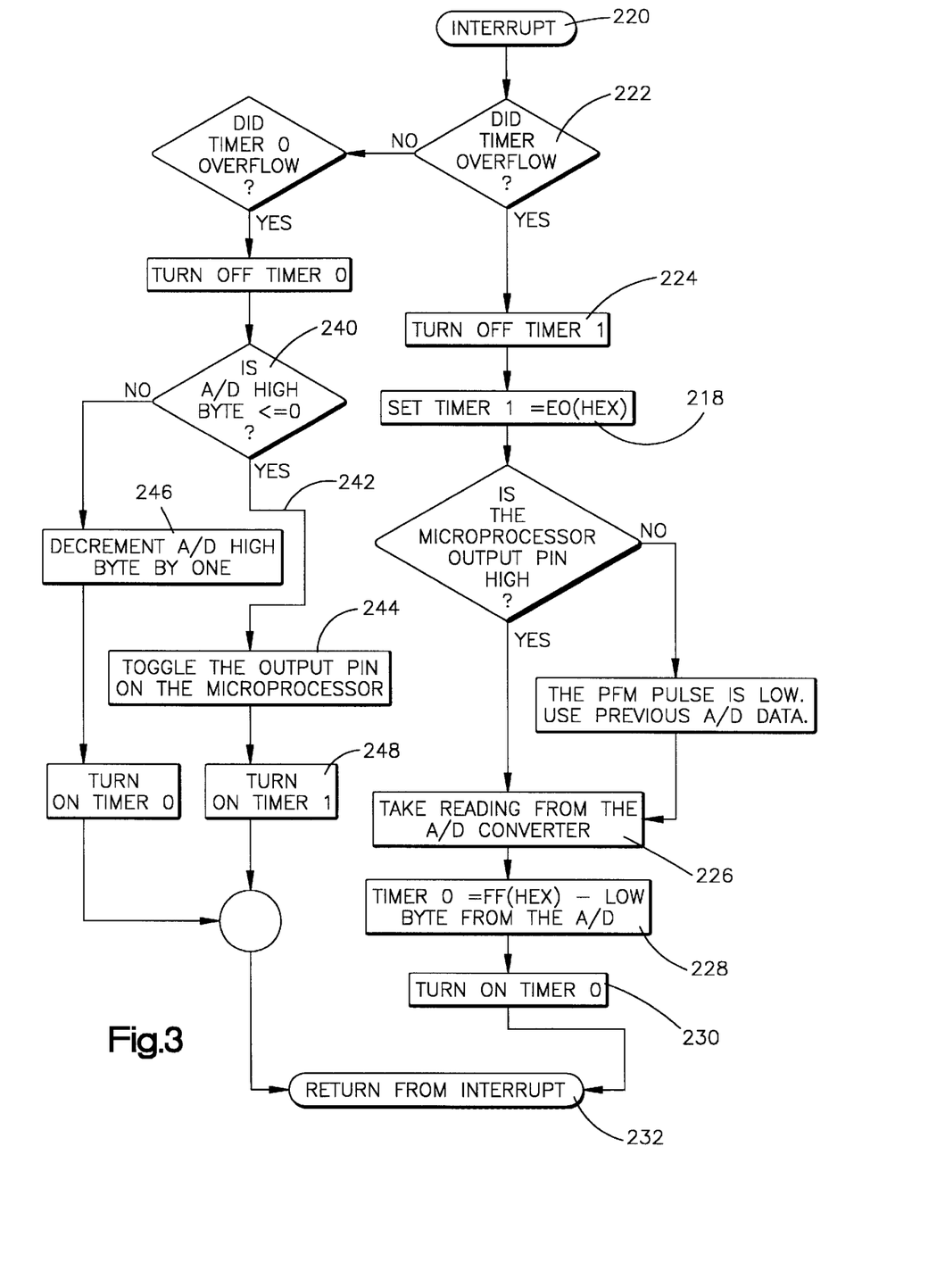
FIG. 3 is a flowchart of a control algorithm for use by a microprocessor that determines a liquid level on the probe.

A process for generating the frequency modulated output from the microprocessor based on the 16 bit digital data from the A/D converter is described in conjunction with the flow diagram of FIG. 3. A source code listing for the microprocessor is contained in appendix A. A data location 'xy' in that listing corresponds to the 16 bit data read into the microprocessor 50 from the analog-to-digital convertor 82. This data representation is a union of a long unsigned integer and two unsigned eight bit integers(xy.high and xy.low). The high and low eight bits of unsigned data is used in the control algorithm summarized in FIG. 3.

When power is first applied to the circuit shown in FIGS. 5A and 5B, the microprocessor 50 executes a start up routine that initializes two sixteen bit timers, timer 0 and timer 1. Timer 1 is a constant duration timer that is loaded at a step 218 with the value hex EO. As seen in the flow chart, if a timer interrupt occurs 220 and the microprocessor confirms 222 that it was timer 1 that overflowed timer 1 is turned off 224. The clock rate of the microprocessor (2 megahertz) and loading the timer with a value of hex EO means it takes approximately 16.382 milliseconds for the timer to overflow (exceed FF) after it is initialized and started.

A variable time interval is added to the fixed time interval of timer 1 by moving at a step 226 the contents of the A/D converter into the contents of 'y', loading 228 the contents of xy.base into timer 0 and turning timer 0 on 230. Note, when the step 230 is reached, timer 1 has been turned off 224 and initialized 218 to its value of hex EO.

After timer 0 begins running 230 from its value of hex FF-xy.base the processor returns 232 from the interrupt processing routine and it takes timer 0 a time related to xy.base to reach FF and cause the next subsequent interrupt 220. This interrupt is not caused by timer 1 since that timer is off so that a "No" path 234 is taken from the test 222. A test 240 then determines whether the xy.high is zero. If that byte is zero a branch 242 is taken to toggle 244 the output 210 to the transistor 212. If the high byte is not zero, the high byte is decremented 246 by one. When the output to the transistor 212 is toggled 244, timer zero is turned off and timer 1 is turned on at a step 248.

Timer 1's run duration does not vary and is always loaded with the same initial value, the frequency adjustment is achieved by the value loaded into xy which in turn dictates the run time of timer 0. The result is a 50% duty cycle signal whose frequency varies based upon the level of immersion of the probe 12 within a liquid within the vessel 14. In accordance with the disclosed embodiment of the invention the frequency with which the transistor is pulsed ranges from 0.5 to 30 hertz.

Figure 6:
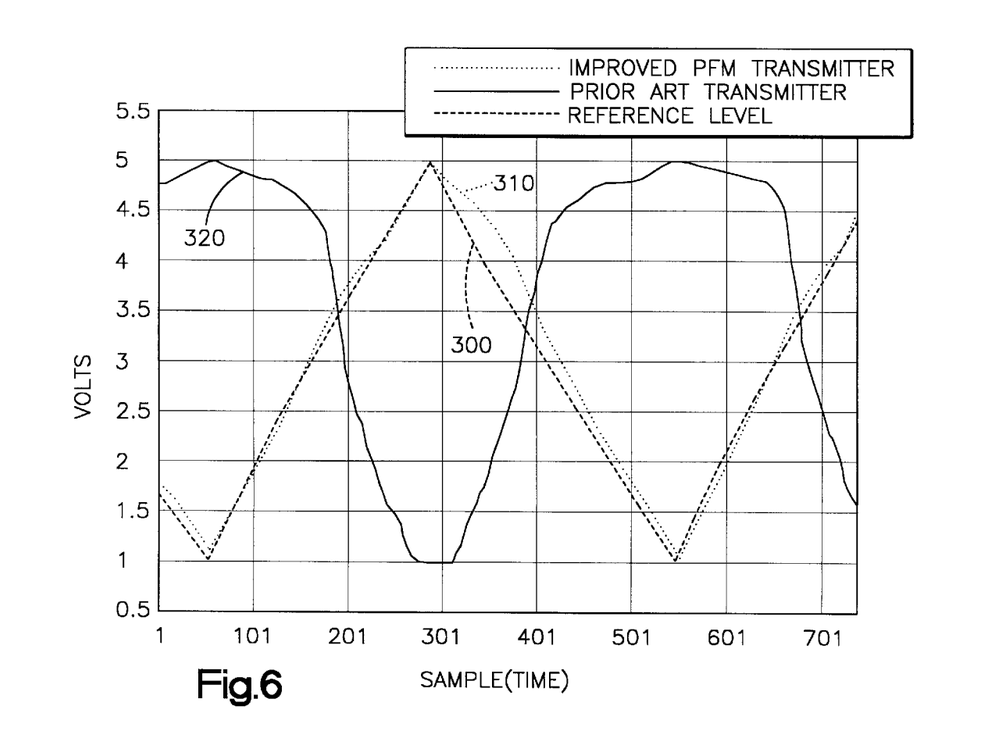
FIG. 6 is a graph showing liquid level measurements performed using a probe operated in accordance with the present invention.

FIG. 6 is a comparison of test data obtained with a probe constructed in accordance with the invention. The horizontal or "x" axis is sample number. Many hundreds of samples are obtained during the test depicted in FIG. 6. This axis is therefore generally related to time. As the liquid level in the vessel 14 changes, the voltage across the sampling resistor changes and the values of this voltage are plotted on the "y" axis. The test data was obtained using catsup as a liquid within the vessel 14. A pump cycled the level of catsup by pumping the catsup from one tank to another, and back again. This procedure explains the rise and fall of the liquid level.

A 'reference level' 300 on the graph is data based on readings from a very accurate but expensive ultrasonic transducer placed in a first tank (tank 1) of the two tanks. Each of the two tanks included baffles that divide the tank into zones or regions separated by the baffles. The liquid level within a tank tended to be non-uniform so that the level within a zone might lag or lead the level in an adjacent zone.

The data 310 obtained with a sensor constructed in accordance with the present invention is shown in FIG. 6 to lag the data 300. A prior art sensor was mounted in tank 2 so that as the level in tank 1 rose the level in tank 2 fell. Stated another way, the prior art sensor data 320 is 180° degrees out of phase from the other two sensors. As the catsup builds up on the probe of the prior art sensor, the conductivity of the coating fools the prior art sensor into thinking that the probe is submerged more than it is. The level output is seen to be nearly 100% when the actual level is much less, but still in contact with the prior art level sensor.

It is understood that while a preferred embodiment of the present invention has been described with a degree of particularity, it is the intent that the invention include all modifications and alterations from the disclosed design falling within the spirit or scope of the appended claims.

APPENDIX A

```c
/* anti-coating PFM output capacitance measurement system */
/*
 The device output will be coded as a pfm current signal.
 Pulse width modulation can also be later added to encode
 other information such as temperature, pressure, or
 diagnositic information.
 Rev. 0 ACPFM Project 2 initial attempt. 7/11/96
 Rev. 1 4 Mhz Master Clock Frequency. 8/6/96
*/
#pragma option v /* verbose option control */
#include <c:  pc[1]6c62.h>//modified 5/15/96 to add CCP1CON bits
#include <c:  pc   ath.h>
/* prototype declarations */
void handle_TMR1();
void TMR0_init();
void TMR1_init();
void test1();
void test2();
void adc_initialize();
void write_adc(int);
void read_adc()
void PWM_init();
void adc_calibrate();
/* Global variables */
unsigned long i, cal_flag;
unsigned int period_scalar = 0; // overflow counter for PFM output
unsigned int period_old = 0;
unsigned int period_lo = 0;
struct hilo {         //A structure for an 8 bit number in bytes
  unsigned int lo;
  unsigned int hi;
}
union long_in_bytes {      //A structure for a 16 bit number in bytes
  unsigned long base;
  struct hilo byte;
};
union long_in_bytes chargetime, chargecurrent, xy, initialsamp, finalsamp, sum;
///////////////////////////////////////////////////
void _INT(void)
{
/* Check which interrupt occured */
SaveContext;
CLRWDT();       // Clear WatchDog Timer
if (PIR1.TMR1IF){      // TMR1 overflow
  T1CON.TMR1ON = 0;
  PIE1.TMR1IE = 0; // Disable timer 1 overflow interrupt
  PIR1.TMR1IF = 0; // Clear T1 Interrupt flag
  INTCON.T0IE = 0;       // Disable Timer 0 overflow interrupt
  INTCON.T0IF = 0;       // Clear T0 interrupt flag
  TMR1L = 0; // Set Timer 1 to overflow in 16 ms
  TMR1H = 0xE0;        // Set Timer 1 to overflow in 16 ms
  T1CON.TICKPS1 = 0; // 1:2 prescale. Reset prescale because it
  T1CON:TICKPS0 = 1; // is cleared whenever you write to TMR1
if(PORTA.0) {         //Is the PFM pulse high?
  period_scalar = xy.byte.hi;
  period_lo = xy.byte.lo;
  period_old = period_scalar;
}
else period_scalar = period_old; //The PFM pulse is low
TMR0 = 0xff period_lo; // Set Timer 0 to overflow
INTCON T0IF = 0;      // Clear T0 interrupt
INTCON T0IE = 1;      // Enable T0 interrupt
}  // if
else if(INTCON.T0IF){ // Timer 0 overflow caused the interrupt
  INTCON.T0IE = 0; // Disable timer 0 overflow interrupt
  INTCON.T0IF = 0; // Clear T0 Interrupt flag
  T1CON.TMR1ON = 0; // Turn Timer 1 off
  PIE1.TMR1IE = 0; // disable timer 2 over-flow interrupt
  PIR1.TMR1IF = 0; // Clear T2 Interrupt flag
  if(period_scalar <= 0) {
   PORTA.0 = !PORTA.0;
   T1CON.TMR1ON = 1;
     PIE1.TMR1IE = 1;
     if(!PORTA.0) cal_flag++; // Increment flag only on falling edge of PFM
  }
  else {
     period_scalar--;
   INTCON.T0IE = 1;
```

-continued

APPENDIX A

```
  };
} //if
CLRWDT(); // Clear WatchDog Timer
RestoreContext;
}
//////////////////////////////////////////////////
void main()
{
   unsigned long i1, i2;
   //Mask and clear all interrupt
   CLRWDT();
INTCON.INTE = 0;
TRISB.0 = 0; // A/D MCLR pin control (set as output)
PORTB.0 = 0; // Disable A/D
cal_flag = 0;
INTCON = 0;
PIR1 = 0;
xy.base = 2;
PORTB.0 = 1;         //ENABLE A/D
TMR0_init();         // initialize Timer 0
TMR1_init();         // initialize Timer 1
INCON.GIE = 1;       // Global interrupt enable
adc_initialize();
PWM_int();           // initialize Time 2 - ccp1 mode PWM
INTCON:PEIE = 1;     // Enable peripheral interrupts
CLRWDT();            // Clear WatchDog Timer
     while(1){
     while(PORTB.1){
     CLRWDT();        // Clear WatchDog Timer
     xy.base = 0xffff;
   } // push to test feature
   while(PORTB.3) CLRWDT(); // Poll DRDY pin and wait for it to go low
     write_adc(0x38);//Write same gain and setup adc for a read of the data reg.
   read_adc(); //Read 2 bytes from ADC
       if(cal_flag>100){       // Calibrate A/D every 10,000 PFM cycles
           adc_calibrate();
           cal_flag = 0;
       }
    }
  } //main
////////////////////////////
////////////////////////////
void TMR0_init()
{ int delay;
  INTCON.T0IE = 0; //disable timer0 overflow interrupt
  PORTA = 0; //initialize port a by setting output data latches
  TRISA.0 = 0; //initialize port a bit zero as output
  //PORTB = 0; //initialize port b by setting output data latches
  OPTION.RBPU_ = 0; // internal pullups on PORT B for push to test
  TRISB.1 = 1; //initialize port b bit 1 as input for push to test
  TRISB.4 = 1; //initialize port b bit 4 as input
  TRISB.2 = 1; //initialize port b bit 2 as input
  OPTION.PS2 = 0; // set prescaler to 1:6
  OPTION.PS1 = 1; // set prescaler to 1:16
  OPTION.PS0 = 1; // set prescaler to 1:16
  OPTION.PSA = 0; // prescaler assigned to TMR0
  TMR0 = 2;       //write inital value to the timer 0 register
  OPTION.T0CS = 0; //select timer mode (internal clock signal)
  period_scalar = 0;
}
void PWM_init()       // initialize the PWM
{
  PR2 = 0x0Sh;         // pwm trequency = 111khz
  CCP1CON.5 = 1;       // pwm duty cycle = 1.5us
  CCP1CON.4 = 1;       // pwm duty cycle = 1.5us
  CCPR1L = 0x00h;      // pwm duty cycle = 1.5us
  TRISC.2 = 0;         // CCP1F, RC1 PWM output enable
  T2CON.T2CKPS1 = 0; // timer 2 prescaler 1:1
  T2CON.T2CKPS0 = 0; // timer 2 prescaler 1:1
  T2CON.TOUTPS3 = 0; // timer 2 post scaler 1:1
  T2CON.TOUTPS2 = 0; // timer 2 post scaler 1:1
  T2CON.TOUTPS1 = 0; // timer 2 post scaler 1:1
  T2CON.TOUTPS0 = 0; // timer 2 post scaler 1:1
  T2CON.TMR2ON = 1;    // timer 2 on
  CCP1CON.CCP1M3 = 1; // PWM MODE
  CCP1CON.CCP1M2 = 1; // PWM MODE
}
////////////////////////////
```

-continued

APPENDIX A

```c
void TMR1_init() // initialize timer 1
{
 T1CON.TMR1ON = 0; // turn off timer 1
 T1CON.T1CKPS1 = 0; // 1:2 prescale
 T1CON.T1CKPS0 = 1; // 1:2 prescale
 PIR1.TMR1IF = 0; //clear timer 1 overflow interrupt flag
 T1CON.T1OSCEN = 1; //Enable internal oscillator
 T1CON.TMR1CS = 0; ///Internal clock (Fosc/4)
 TMR1L = 0;
 TMR1H = 0xE0
 PIE1.TMR1IE = 1; //Enable timer 1 overflow interrupt
 T1CON.TMR1ON = 1; // turn on timer 1
}
////////////////////////
/* void handle_TMR1()
{
 chargetime.base = 0xffff;
 xy.base = 0xffff;
 TMR1H = 0;
 TMR1L = 0;
 CCPR1L = 0;
 CCPR1H = 0;
 timedone = 1;
}
*/
void adc_initialize() //This routine sets up the micro in SPI mode and initializes the ADC
{
 TRISC.4 = 1; //Make Serial Data Input pin an input
 TRISC.5 = 0; //Make Serial Data Output pin an output
 TRISC.3 = 0; //Make Serial Clock an output
 TRISC.7 = 0; //RC7 is an output. This pin is the chip select for the A/D
 TRISB.3 = 1; //RB3 is an input. This is the DRDY pin, a status signal to indicate data ready
 TRISB.1 = 1; //RB1 is an input. This is the input for the push to test feature
 PORTC.7 = 1; // Chip de-select for a/d
 PORTB.0 = 1; // Enable the A/D
 SSPCON.SSPEN = 0; //Clear the Enable bit
 SSPCON.SSPM0 = 1; // SPI master mode, clock = osc/16
 SSPCON.SSPM1 = 0; // SPI master mode, clock = osc/16
 SSPCON.SSPM2 = 0; // SPI master mode, clock = osc/16
 SSPCON.SSPM3 = 0; // SPI master mode, clock = osc/16
 SSPCON.CKP = 1; //Transmit on fatting edge, receive on rising edge, idle = high
 SSPCON.WCOL = 0;
 SSPCON.SSPEN = 1; // Enables SCK,SDO,SDI as serial port pins (SPI Mode)
 adc_calibrate(); // Self-calibrate the A/D converter
}
void adc_calibrate()
{
  PORTB.0 = 0;
  NOP();
  NOP();
  NOP();
  NOP();
  NOP();
  NOP();
  PORTB.0 = 1;
  NOP();
  NOP();
  NOP();
  NOP();
  NOP();
  NOP();
 write_adc(0x10);    // Write to Comm Reg.: set gain = 1, Set next operation
            // to write to Setup Reg.
 write_adc(0x66);    // Write to Setup Reg.: Self Cat, 1MHz clock, 20 Hz update rate,
            / /5.24 Hz filter
 NOP();
 CLRWDT();.
 while(!PORTB.3) {
  PORTB.0 = 0;
  NOP();
  NOP();
  NOP();
  NOP();
  NOP();
  NOP();
  PORTB.0 = 1;
  NOP();
  NOP();
```

-continued

APPENDIX A

```
  NOP();
  NOP();
  NOP();
  write_adc(0x10);
  write_adc(0x66);
  NOP();
  CLRWDT();
}
while(PORTB.3) CLRWDT(); //Poll DRDY pin and wait for it to go low
write_adc(0x38); // Write same gain and setup adc for a read of the data reg
read_adc();      // 16 bit read
}
void write_adc(int data_to_send)
{
  CLRWDT();
  PORTC.7 = 0; //Chip select for a/d
  SSPCON.WCOL = 0;
  SSPBUF = data_to_send //send byte to a to d
  while(SSPCON.WCOL){ //Re-send data if necessary
    SSPCON.WCOL = 0;
       SSPBUF = data_to_send;
  }
  while(!PIR1.SSPIF); //Wait until send is complete
  PIR1.SSPIF = 0; //Clear SPI interrupt flag
  PORTC.7 = 1; //Chip de-select for a/d
}
void read_adc()
{
  int i, reg_length = 2;
  PORTC.7 = 0; // Chip select for a/d
  SSPCON.WCOL = 0;
  for(i = 0; i < reg_length; i++){
    CLRWDT();
       SSPBUF = 0; // Write dummy data
       while(SSPCON.WCOL) {
         SSPCON.WCOL = 0;
         SSPBUF = 0;
       }
       while(!SSPSTAT.BF); //Wait until receive is complete
       PIR1.SSPIF = 0; // Clear the interrupt flag
       if(i<1) //Read the high byte first
         xy.byte.hi = SSPBUF; //Read high byte of data from SPI buffer
       else
         xy.byte.lo = SSPBUF; //Read low byte
       PIR1.SSPIF = 0;       //Clear SPI interrupt flag
  }
  PORTC.7 = 1; // De-select a/d
  CLRWDT();
}
```

We claim:

1. A level detector circuit for determining a level of immersion of an elongated probe within a liquid comprising:
   a) a first current source for charging an elongated probe with a charging current that depends upon a length of the elongated probe immersed within a liquid;
   b) a sensing circuit for monitoring a voltage on the elongated probe as the first current source charges the probe and providing a control output based on the voltage on the elongated probe;
   c) a second current source coupled to the control output from the sensing circuit for providing an output current based on a charging of the elongated probe by the first current source;
   d) monitoring circuitry for developing an analog level signal based on the output current provided by the second current source; and
   e) conversion circuitry coupled to the monitoring circuitry for providing a frequency modulated communications signal corresponding to the analog level signal related to the length of the probe immersed within the liquid.

2. The level detection circuit of claim 1 wherein the first current source comprises a first regulated current carrying device and wherein said level detection circuit further comprises an additional current source that includes a regulated current carrying device that charges a capacitor at a constant current rate and wherein the sensing circuit compares the voltage on the capacitor with the voltage on the probe to provide a control signal for adjusting current provided by the second current source.

3. The level detection circuit of claim 2 wherein the second current source comprises a control signal regulated current carrying device and wherein the first current source comprises a second control signal regulated current carrying device which tracks current through the control signal regulated current carrying device of the second current source and also charges the elongated probe at a rate dependant on the control signal.

4. The level detection circuit of claim 3 wherein the sensing circuit comprises a difference amplifier for providing a difference signal related to a difference of voltage on the probe and the capacitor for controlling current through said control signal regulated current carrying device of the second current source.

5. The level detection circuit of claim 1 wherein the conversion circuitry comprises an analog to digital converter for converting the analog signal to a digital signal at periodic intervals and further comprises a programmable controller for generating a pulse frequency modulated output from the level detection circuit.

6. The level detection circuit of claim 5 additionally comprising means coupled to the programmable controller for turning on and off a signaling device at a controlled rate to generate a pulse frequency modulated signal.

7. The level detection circuit of claim 6 wherein the signaling device comprises a device for adjusting the current drawn by the level detection circuit to allow a remote circuit to monitor the pulse frequency modulated signal.

8. The level detection circuit of claim 7 wherein the signaling device additionally comprises a visual signaling device.

9. A method for determining a level of immersion of an elongated probe within a liquid comprising the steps of:

a) charging an elongated probe with a charging current that depends upon a length of the elongated probe immersed within a liquid;

b) sensing a voltage on the probe as the charging current charges the probe and providing a second output current based on the sensing of voltage;

c) developing an analog level signal based on the second output current; and d) providing a frequency modulated communications signal corresponding to the analog level signal that is related to the length of the probe immersed within the liquid.

10. The method of claim 9 wherein the charging step is accomplished by providing a first regulated current carrying device and further providing an additional regulated current carrying device that tracks current through the first regulated current carrying device to charge a capacitor at a controlled rate and wherein the sensing step compares the voltage on the capacitor with the voltage on the probe to provide a control signal.

11. The method of claim 9 wherein the analog signal is converted to the digital signal at periodic intervals and further comprises the step of turning on and off a signaling device at a controlled rate to generate a pulse frequency modulated signal output signal related to probe immersion within the liquid.

12. A level detector circuit for determining a level of immersion of an elongated probe within a liquid comprising:

a) a first current source including a first regulated current carrying device for charging an elongated probe with a charging current that depends upon a length of the elongated probe immersed within a liquid;

b) a second current source for providing output current based on the charging current provided to the elongated probe by the first current source;

c) an additional current source that includes a regulated current carrying device that charges a capacitor at a constant current;

d) a sensing circuit coupled to the reference current source for monitoring a voltage on the elongated probe as the first current source charges the probe and for comparing the voltage on the capacitor with the voltage on the probe and providing a control signal for adjusting current provided by the second current source based on the comparison of the two voltages; and e) monitoring circuitry for developing an analog level signal based on the current provided by the reference current source.

13. The level detection circuit of claim 12 wherein the second current source comprises a control signal regulated current carrying device and wherein the first current source comprises a second control signal regulated current carrying device which tracks current through the control signal regulated current carrying device of the second current source and also charges the elongated probe at a rate dependant on the control signal.

* * * * *